UNITED STATES PATENT OFFICE.

ELMER A. SPERRY, OF BROOKLYN, NEW YORK.

PROCESS OF DETINNING.

No. 873,699.   Specification of Letters Patent.   Patented Dec. 10, 1907.

Application filed April 13, 1906. Serial No. 311,560.

*To all whom it may concern:*

Be it known that I, ELMER A. SPERRY, a citizen of the United States, residing at Brooklyn, in the county of Kings and State of New York, have invented new and useful Improvements in Processes of Detinning, of which the following is a specification.

My invention relates to de-tinning and consists of a process whereby tin scrap or other tin bearing material may be treated in an economical and commercial method and one adapted to the conditions which exist in handling large masses of material from which only small recoveries are to be expected.

It further consists in steps of the process which guard against the losses of values which are thus reclaimed and by means of which these values are converted into commercial and marketable form.

It has long been known that a dry method of de-tinning would possess advantages over the wet process; the great bulk of the material to be handled together with the extremely large surface exposed, together with the small percentage of tin present, also the necessity of freedom from rust of the sheet steel remaining, all point to the desirability of a dry over a wet method. Attempts have been made and suggestions have been put forward, but none of these processes appear to have been adopted. The reason is not far to seek. When chlorin is used as the de-tinning agent the almost absolute dryness necessary to be attained and also maintained throughout, not only with the incoming gas but with each fresh addition of tinned material or scrap itself: furthermore, the necessity of eliminating other active gases and also the necessity of preventing the formation of ferric chlorid which in presence of moisture breaks up into hydrochloric acid and iron oxid and thus attacking further masses of the steel, all point to the necessity of seeking a method that will at once eliminate the difficulties pointed out and effectually prevent the multiplication of secondary reactions which decrease the efficiency and destroys the value of the steel scrap. This scrap to be commercial should be thoroughly free from foreign metals, these elements remaining below .04 per cent. and the scrap which remains should be free from rust.

Chlorin gas as most abundantly produced is usually adulterated with air, $CO_2$ and also carries moisture. The problem kept in view in the present process is to utilize such a gas in the commercial reclaiming of both the tin and the steel from tin scrap which may be considered as the principal form of raw material. In seeking the solution of this problem I have at last found a gaseous substance which when associated with chlorin renders the process both workable and profitable. The present specification sets forth both the details and process of de-tinning based on my discovery and states the adjustment of conditions imposed in commercial adaptation thereof and also points out by way of illustration one method of carrying the process into effect.

My invention consists in subjecting the material to be de-tinned to various steps in a process including treating with gaseous mixture under certain specified conditions of temperature control and also control of the ingredients of such mixture which I have discovered to be effective in the complete removal of the tin and also leaving the scrap in the best possible condition for the market.

I have discovered that a mixture of gaseous stannic chlorid, particularly anhydrous stannic chlorid, with chlorin fulfils the manifold conditions imposed in a successful commercial process more completely than any compound I have used. Especially is this true considering the fact that chlorin as at present produced is associated with more or less abundant mixture of air, other gases and moisture, as above stated. Moreover it is very difficult not only to dry the gas but to keep it dry during the progress of the process. Any moisture contained in the gases or the tin bearing material, such, for instance, as metal cuttings or scrap causes attack upon the steel. I have found that this attack is prevented by the presence of the chlorid, this being one of the manifold functions performed by its presence. The invention also includes such steps as the freeing of the material of the last trace of chlorid or chlorid hydrate by suitable means some of which are pointed out to illustrate this treatment.

To illustrate one method of carrying out my invention, I take chlorin in any of its forms, for instance that which constitutes the largest of all known supplies, namely the gases arising from an electrolytic plant for decomposition of common salt; these gases usually consist of chlorin, air and some $CO_2$, all saturated with moisture at the temperature. These are first chilled or refrigerated to throw out all the moisture possible in this manner and then treated with anhydrous stannic chlorid either as a liquid or a vapor or steam, the latter being preferred. The gas is preferably heated at this point though this may not in some cases be necessary. Any desired amount of chlorid may thus be associated with the gaseous chlorin and accompanying gases to or even beyond the point of saturation of the gases with the chlorid. If, however, too much chlorid is found to be taken up or to be entrained with the gases, a part may be thrown out by chilling to a more or less degree, thus giving an easy method of gaging the chlorid content. The chlorid thus condensed may be returned to the liquid in the drying or treating vessel or to the boiler for the chlorid which produces the steam or vapor for the treatment. When gaseous chlorin, either diluted or otherwise, is thus refrigerated to throw out all the moisture possible as stated above, the gas may be rendered anhydrous as chlorin anhydrid is formed locking up, so to speak, and thus eliminating such moisture as remains or is present at the temperature in the chlorin and also the other gases if any are present. If desired the chlorin may then be still further cooled and even liquefied, but as is well known, upon again being warmed it expands as a gas to its original, or even a greater volume, depending of course upon the final temperature.

The material to be treated is placed in a treating vessel or vessels, which may be of any convenient form and which will preferably permit of quite a range of temperature control, as by means for both heating and cooling. Though a plurality of such chambers may be employed, the process may be carried on with good results in a single chamber. The contents may be heated, as the treating mixture brought into contact therewith, though not necessary to the invention. There may be a plurality of such vessels which are preferably coupled in series by conduits which are covered or otherwise organized to prevent escape of heat of the gases as they pass from one treating chamber to another, and the conduits also include a condenser which the gases are compelled to traverse and wherein some of the chlorids of tin are condensed and recovered. These condensers are provided with suitable cooling means which as in the case of the first one mentioned are governed in such way as to remove any predetermined portion or percentage of the chlorid content. As the gases that have been refrigerated, or otherwise treated for eliminating the moisture, are expanded and admitted in the gaseous state to the reaction chamber, the tin upon the scrap or other tin bearing material which, while it remains in the process, I denominate raw material, is very quickly converted into chlorid. The gas may take up such chlorid in whole or part and carry it along as vapor; the remaining chlorid is drawn from the treating chamber as desired. The gases may absorb the vapors to the point of saturation. Some in addition may also be entrained therewith so that the gases are found to be associated with more chlorid than is necessary for carrying on the process in the successive chambers when these are employed. The excess of chlorid is removed by the condensers as described in connection with that first mentioned, this being accomplished between the chambers as explained.

It will be understood that the gaseous mixture contains an amount of stannic chlorid hydrate. This is an active agent in de-tinning as it takes up tin to form stannous chlorid which quickly is transformed into stannic chlorid through the action of the chlorin present. The hydrate also is an active carrier of chlorin to tin as has been previously pointed out by me in this art. The important function of the anhydrous content of the gas is self evident as it stands ready to take up any water or moisture introduced, opened up or developed in the scrap or gases during the treatment, also such moisture as may accumulate on the walls of the chambers standing open during the process of re-charging. For some purposes the vessels may be connected in rotation. Here a plurality of treating chambers are so coupled, for instance in a circle or endless series, so that the re-agent can be introduced and removed at any point; that is, any chamber may become the first in the series and any one the last in the series, the arrangement being such as usually to leave one or more chambers between the first and the last which are idle and from which the materials are being either introduced or withdrawn. Considering any arrangement that will harmonize with this general idea, it will readily be understood that the condenser attached to the idle chambers will also be out of circuit and idle. The gases after having passed through the series of vessels and their interspersed condensers, and having also passed the condenser attached to the vessel, which for the time being is last in the series, the residuary gases are conducted into a tower, scrubber or equivalent device and are there treated with a solvent not only for the stannic chlorid content of the gases but also such as will act to absorb or dissolve any remaining chlorin as well. Stannous chlorid and water are substances which may be cited as fulfiling this specification. In treating relative temperatures herein, I prefer to state same in terms of congealing points rather than the melting points of the hydrated stannic chlorid as the congealing points seem to be much more uniform than the apparent melting points for the various hydrates or hydrates with various waters of hydration.

The gases on their way to the tower are insulated against loss of heat or jacketed to prevent loss of heat or supplied with sufficient heat to prevent them from condensing and stopping the passages. To further illustrate one method of procedure, it will be interesting to note that the progression of the gases through the series is preferably backward—that is, backwardly with reference to the progression of the series itself; the gases entering on the vessel which has been longest in treatment and leaving by the vessel which is freshly charged with scrap or tin bearing material. By this means the exhausted gases are brought into contact with the fresh masses and conversely the strongest reactions are brought to bear upon the scrap or raw material which is to be finished and which has already been subjected to the treatment the longest. During normal operation the temperature of each chamber is adjusted to best suit the necessity of the case, and also for best degree of penetration into the recesses of the more or less tightly packed portions of the scrap. Generally speaking, however, the temperature of the series is preferably controlled so that the temperature may be gradually increased as the operation of any given mass of scrap proceeds. To further illustrate one method of procedure; a body of scrap or raw material, its chamber and connected condenser which is the next one to be taken out of series and when so taken out is first exhausted and the gases returned to the system; next the connection with the system is broken and this chamber is connected direct to the tower and the further exhaustion of the chamber is led directly thereto so that the values may be dissolved as above described. During this exhaustion in some instances it is found best to elevate the temperature above that used in the normal operation, which is also true in the next step where the temperature may be forced still higher to aid in the removal of any stannic chlorid hydrate which may have crystallized upon the surface of the scrap during this step or after. Preferably the farthest point removed from the suction is then opened to the air and the exhaustion proceeds accompanied by the inrush of air or inert gas, preferably dried and heated air, by means of which the remaining material or black scrap is freed from the last vestage of the remaining chlorid in any manner best suited to the purpose. After these are thoroughly removed the chamber is opened up, scrap removed and fresh supply introduced. Thereupon the chamber is then closed and the mass is ready for the next shift in the progression of the series. In some instances the scrap is then washed free and clarified from the vapors which it may still contain after cooling.

The order of the steps and their detail may be varied and some may be used without the others and the invention extends to such use.

I claim

1. The method of de-tinning which consists in subjecting the raw material to the persistent action of a mixture of gaseous stannic chlorid and chlorin.

2. The method of de-tinning which consists in re-acting upon dry material to be de-tinned with a mixture of gaseous hydrated and anhydrous stannic chlorid and chlorin.

3. The method of de-tinning which consists in subjecting the raw material to the persistent action of a heated mixture of gaseous stannic chlorid and chlorin.

4. The method of de-tinning which consists in subjecting the raw material to the persistent action of a mixture of gaseous stannic chlorid and chlorin at a temperature above the congealing point of stannic chlorid hydrate.

5. The method of de-tinning which consists in subjecting the raw material to the persistent action of a mixture of gaseous stannic chlorid and chlorin and controlling the temperature.

6. The method of de-tinning which consists in subjecting the raw material while in a dry heated state to the persistent action of a mixture of gaseous stannic chlorid and chlorin.

7. The method of de-tinning which consists in re-acting upon dry material to be de-tinned with a mixture of gaseous stannic chlorid and chlorin and gradually increasing the temperature of the re-acting mass as the process goes forward.

8. The method of de-tinning which consists in first treating chlorin with stannic chlorid and re-acting with chlorin thus treated upon a body of tinned material.

9. The method of de-tinning which consists in treating chlorin with stannic chlorid vapors at an elevated temperature and cooling the mixed gases thus produced and re-acting with chlorin thus treated upon the tinned material.

10. The method of de-tinning which consists in first treating chlorin gas and air with stannic chlorid and re-acting with chlorin thus treated upon a body of tinned material.

11. The method of de-tinning which consists in re-acting upon dry material to be de-tinned with a mixture of gases containing chlorin and afterward heating the metal and treating same with air.

12. The method of de-tinning which consists in re-acting upon dry material to be de-tinned with a mixture of gases containing chlorin and afterward heating the metal and treating same with heated air.

13. The method of de-tinning which consists in treating separate but connected bodies of tinned material with a mixture of gaseous stannic chlorid and chlorin and removing stannic chlorid from the treating fluid intermediate between each of such bodies.

14. The method of de-tinning which consists in treating separate but connected bodies of tinned material with a mixture of gaseous stannic chlorid and chlorin and removing chlorinated stannic chlorid content of the treating fluid intermediate between such bodies.

15. The method of de-tinning which consists in treating separate but connected bodies of tinned material with a mixture of gaseous stannic chlorid and chlorin and successively removing the chlorid from the treating gas by changing the temperature of such gases.

16. The method of de-tinning which consists in treating separate but connected bodies of tinned material with a mixture of gaseous stannic chlorid and chlorin and successively removing the chlorid from the treating gas and bringing the terminal gases into contact with a solvent for stannic chlorid.

17. The method of de-tinning which consists in successively treating separate bodies of tinned material with a mixture of gaseous stannic chlorid and chlorin and successively removing the chlorid from the treating gas and bringing the terminal gases into contact with a solvent for stannic chlorid and chlorin.

18. The method of de-tinning which consists in re-acting upon the material to be de-tinned in its dry state with gaseous chlorin which consists in refrigerating such chlorin, treating it with a drying agent, then cooling the gas to expel excess of the drying agent and bringing the chlorin together with the drying agent in gaseous form into the reaction chamber.

19. The method of de-tinning which consists in the persistent reaction upon the material to be de-tinned in its dry condition of a mixture of gaseous stannic chlorid and chlorin which has been cooled to avoid excess of stannic chlorid.

20. The method of de-tinning which consists in re-acting upon the material to be de-tinned in its dry state with a mixture of air, chlorin and water vapor, all of which have been heated, treated with stannic chlorid and afterward chilled.

21. A method of de-tinning which consists in subjecting a plurality of bodies of raw material to the persistent action of gaseous stannic chlorid and chlorin, disconnecting one of such bodies, removing the gases therefrom and returning the same to the process.

22. The method of de-tinning which consists in treating separate bodies of tinned material with gaseous chlorin, disconnecting one of such bodies, removing the gases therefrom and returning same to the process and then drawing air through such body and a solvent for stannic chlorid.

23. The method of de-tinning which consists in treating separate bodies of tinned material with gaseous chlorin, disconnecting one of such bodies, removing the gases therefrom and returning same to the process and then drawing air through such body while at an elevated temperature.

24. The method of de-tinning which consists in subjecting a plurality of bodies of raw material to the persistent action of gaseous stannic chlorid and chlorin, disconnecting one of such bodies, removing the gases therefrom, removing chlorid from such gases and returning the residual gases to the process.

25. The method of de-tinning which consists in treating separate bodies of tinned material with gaseous chlorin, disconnecting one of such bodies, removing the gases therefrom, bringing the gases thus obtained into contact with a solvent for the chlorid of tin and chlorin.

26. The method of de-tinning which consists in re-acting upon a body of raw material while in its dry state with a mixture of gaseous stannic chlorid and chlorin and conducting such gases to and from the reaction chamber at an elevated temperature.

27. The method of detinning which consists in re-acting upon a body of raw material while in its dry state with a mixture of gaseous stannic chlorid and chlorin and conducting such gases to and from the reaction chamber at a temperature above the congealing point of stannic chlorid hydrate.

28. A method of detinning which consists in subjecting the raw material to the persistent action of a mixture of gaseous stannic chlorid and chlorin and afterwards treating same with heated air.

29. The method of detinning which consists in subjecting the raw material to the persistent action of a mixture of gaseous stannic chlorid and chlorin and afterwards treating same with heated air and bringing the resulting gases into contact with a suitable solvent.

30. The method of detinning which consists in subjecting the raw material to the persistent action of a mixture of gaseous stannic chlorid and chlorin, cutting off the supply and bringing the material to a higher than re-acting temperature while still connected to a receiver for stannic chlorid.

31. The method of detinning which consists in subjecting the raw material to the persistent action of a mixture of gaseous stannic chlorid and chlorin, cutting off the supply and bringing the material to a higher than re-acting temperature and supplying an inert gas to the material.

32. The method of detinning and producing stannic chlorid which consists in treating the masses to be detinned with chlorin and raising and lowering the temperature of the mass during de-tinning by means out of contact therewith.

33. The method of detinning which consists in first refrigerating gaseous chlorin for drying or rendering same anhydrous, raising the temperature and then subjecting the raw material to action of the dry chlorin so treated.

34. The method of de-tinning and producing stannic chlorid which consists in treating the masses to be de-tinned with chlorin while controlling the temperature, finishing at a higher temperature than that used at the start such heat being furnished by extraneous means.

In testimony whereof I have hereunto set my hand in presence of two subscribing witnesses.

ELMER A. SPERRY.

Witnesses:
MARGARET HICKEY,
ANNA T. BURT.